US008300699B2

(12) United States Patent
Stivers et al.

(10) Patent No.: US 8,300,699 B2
(45) Date of Patent: Oct. 30, 2012

(54) SYSTEM, METHOD, AND COMPUTER-READABLE MEDIUM FOR REDUCING REQUIRED THROUGHPUT IN AN ULTRA-WIDEBAND SYSTEM

(75) Inventors: Fred S. Stivers, Wylie, TX (US); Felix C. Fernandes, Plano, TX (US); Sidney B. Schrum, Jr., Fairview, TX (US); Matthew B. Shoemake, Allen, TX (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 11/756,428

(22) Filed: May 31, 2007

(65) Prior Publication Data

US 2008/0298463 A1 Dec. 4, 2008

(51) Int. Cl.
*H04N 7/12* (2006.01)
*G06F 15/00* (2006.01)

(52) U.S. Cl. ......... 375/240.21; 375/240.01; 375/240.24; 345/501; 345/545; 345/547; 345/562; 382/236

(58) Field of Classification Search .................. None
See application file for complete search history.

(56) References Cited

U.S. PATENT DOCUMENTS

| | | | | | |
|---|---|---|---|---|---|
| 4,597,010 | A | * | 6/1986 | Carr ........................ | 375/240.12 |
| 5,056,044 | A | * | 10/1991 | Frederickson et al. ....... | 345/568 |
| 5,193,148 | A | * | 3/1993 | Alcorn et al. ................ | 345/562 |
| 5,471,248 | A | | 11/1995 | Bhargava et al. ........ | 375/240.24 |
| 5,488,570 | A | * | 1/1996 | Agarwal ........................ | 345/501 |
| 5,508,942 | A | * | 4/1996 | Agarwal ........................ | 709/204 |
| 5,774,186 | A | * | 6/1998 | Brodsky et al. ................ | 348/553 |
| 6,212,232 | B1 | * | 4/2001 | Reed et al. ................ | 375/240.03 |
| 6,385,248 | B1 | * | 5/2002 | Pearlstein et al. ........ | 375/240.25 |
| 6,404,425 | B1 | * | 6/2002 | Cosman ........................ | 345/419 |
| 6,825,847 | B1 | * | 11/2004 | Molnar et al. ................. | 345/555 |

(Continued)

FOREIGN PATENT DOCUMENTS

CN    1617107 A    5/2005

(Continued)

OTHER PUBLICATIONS

'Efficient Selective Frame Discard Algorithms for Stored Video Delivery Across Resource Constrained Networks' by Zhang et al., from Real-Time Imaging, vol. 7, Issue 3, pp. 255-273, Year of Publication: 2001.*

(Continued)

*Primary Examiner* — Steven Snyder
(74) *Attorney, Agent, or Firm* — Nicholas J. Pauley; Peter Michael Kamarchik; Jonathan T. Velasco

(57) ABSTRACT

A system, method and computer-readable medium for reducing the required throughput in an ultra-wideband system is provided. A temporal sub-sampling routine limits the number of frames, or portions thereof, to be transmitted to a sink over an RF link. The temporal sub-sampling routine may have a fixed, or static, sub-sampling rate that specifies the rate at which frames are discarded. In accordance with another embodiment, an automatic temporal sub-sampling mechanism is provided. Additionally, a tile copying mechanism may be implemented for reducing the throughput of the RF link. A WDV subsystem may include an interface to an external frame buffer that facilitates the temporal sub-sampling and tile copy routines disclosed herein.

29 Claims, 11 Drawing Sheets

U.S. PATENT DOCUMENTS

| | | | |
|---|---|---|---|
| 6,873,658 B2 | 3/2005 | Zhou | 375/240.25 |
| 6,959,045 B2 * | 10/2005 | Hurst, Jr. | 375/240.21 |
| 6,999,087 B2 * | 2/2006 | Lavelle et al. | 345/543 |
| 7,006,698 B2 | 2/2006 | Adiletta et al. | 382/236 |
| 7,053,863 B2 * | 5/2006 | Glen et al. | 345/2.3 |
| 7,170,515 B1 * | 1/2007 | Zhu | 345/422 |
| 7,659,893 B1 * | 2/2010 | Oberman et al. | 345/422 |
| 7,692,659 B1 * | 4/2010 | Molnar et al. | 345/501 |
| 2003/0058221 A1 * | 3/2003 | Tucker et al. | 345/163 |
| 2004/0042547 A1 * | 3/2004 | Coleman | 375/240.01 |
| 2004/0100471 A1 | 5/2004 | Leather et al. | 345/506 |
| 2004/0131115 A1 * | 7/2004 | Burgess et al. | 375/240.01 |
| 2004/0179019 A1 | 9/2004 | Sabella et al. | 345/537 |
| 2004/0268397 A1 * | 12/2004 | Dunbar et al. | 725/88 |
| 2005/0060497 A1 | 3/2005 | Krissell et al. | |
| 2005/0123044 A1 | 6/2005 | Katsavounidis et al. | 375/240.12 |
| 2005/0235014 A1 * | 10/2005 | Schauser et al. | 707/204 |
| 2005/0289631 A1 | 12/2005 | Shoemake | |
| 2006/0002315 A1 * | 1/2006 | Theurer et al. | 370/261 |
| 2006/0143335 A1 | 6/2006 | Ramamoorthy et al. | |
| 2006/0153291 A1 | 7/2006 | Christison | 375/240.01 |
| 2007/0116110 A1 * | 5/2007 | Diamant et al. | 375/240 |
| 2008/0137728 A1 * | 6/2008 | Van Der Stok et al. | 375/240.01 |
| 2010/0067598 A1 * | 3/2010 | Sampath et al. | 375/262 |

FOREIGN PATENT DOCUMENTS

| | | |
|---|---|---|
| EP | 790725 A2 * | 8/1997 |
| JP | 63082078 | 4/1988 |
| JP | 6351010 A | 12/1994 |
| JP | 7170291 A | 7/1995 |
| JP | 2003517749 A | 5/2003 |
| WO | WO 03053063 A1 * | 6/2003 |
| WO | WO 2006075302 A1 * | 7/2006 |

OTHER PUBLICATIONS

IBM Technical Disclosure NN9412611.*

'Selective Frame Discard for Interactive Video' by Chebrolu et al., 2004 IEEE International Conference on Communications.*

'A Rate-Control Scheme for Video Transport over Wireless Channels' by Aramvith et al., IEEE Transactions on Circuits and Systems for Video Technology, vol. 11, No. 5, May 2001.*

IBM Technical Disclosure Bulletin NN9412611, published on Dec. 1, 1994.*

International Search Report and Written Opinion of the International Searching Authority from Patent Cooperation Treaty Application No. PCT/US2008/064868, dated Sep. 8, 2008, pp. 1-9.

Gunther Liebl et al: "Radio Link Buffer Management and Scheduling for Wireless Video Streaming", Telecommunication Systems; Modeling, Analysis, Design and Management, Kluwer Academic Publishers, Bo, vol. 30, No. 1-3, Nov. 1, 2005, pp. 255-277, XP019215911, ISSN: 1572-9451, DOI: 10.1007/S11235-005-4328-X.

Hannuksela M M et al: "H. 264/AVC video for wireless transmission", IEEE Wireless Communications, IEEE Service Center, Piscataway, NJ, US, vol . 12, No. 4, Aug. 1, 2005, pp. 6-13, XP011137994, ISSN: 1536-1284.

Supplementary European Search Report—EP08756296—Search Authority—Munich—Nov. 22, 2011.

* cited by examiner

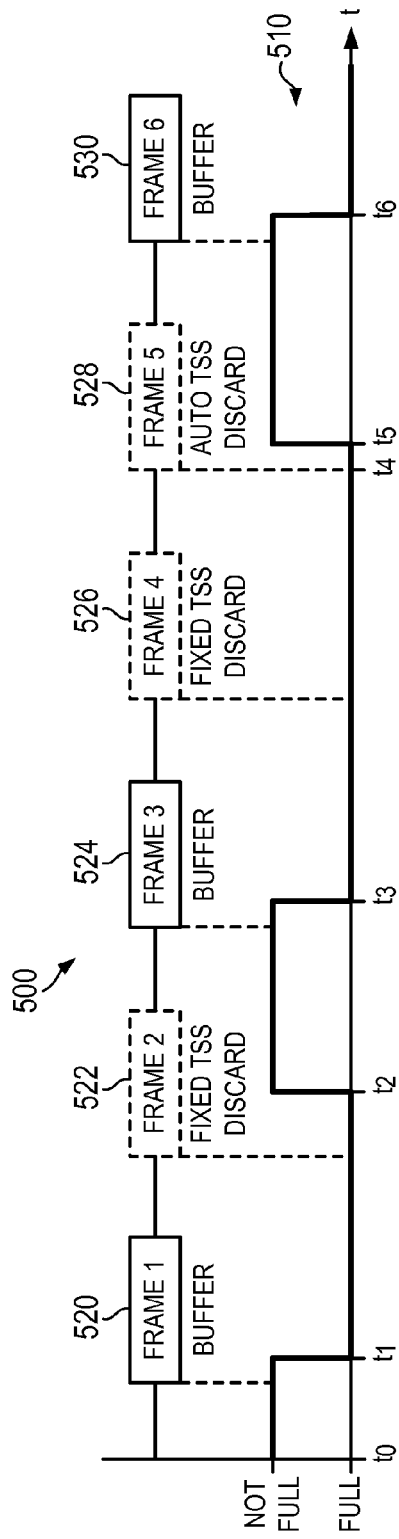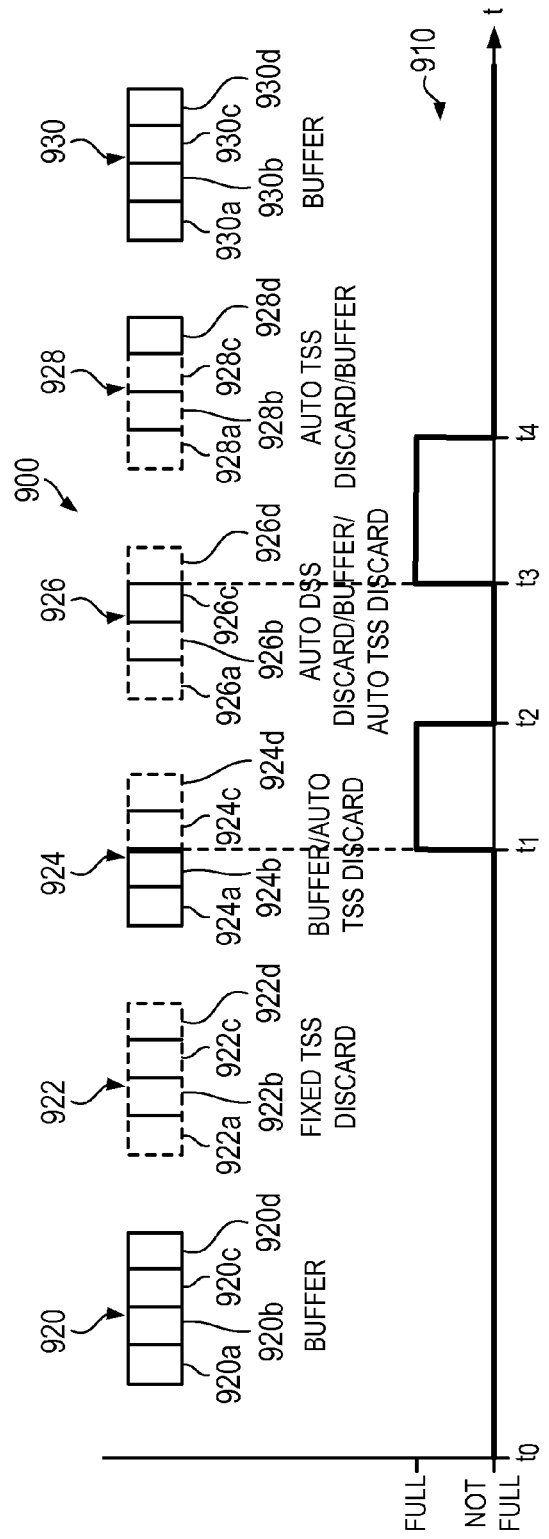

US 8,300,699 B2

SYSTEM, METHOD, AND COMPUTER-READABLE MEDIUM FOR REDUCING REQUIRED THROUGHPUT IN AN ULTRA-WIDEBAND SYSTEM

BACKGROUND

Ultra-wideband (UWB) includes technology having a bandwidth larger than 500 MHz or 25 percent of a center frequency. Contemporary interest exists in development of wireless versions of serial technologies, such as universal serial bus (USB), capable of UWB transmission rates due to the proliferation of USB-adapted devices in various computational and media systems.

A content source, referred to herein as simply a source, may comprise a computer system such as a laptop system, a set-top box adapted to receive television or other media programming, a DVD player, or any other apparatus adapted to transmit or otherwise convey content to a content sink, referred to herein simply as a sink. A sink may comprise, for example, an LCD display device, a plasma display panel, speakers, a hard drive, a printer, or other device adapted to output or otherwise utilize content received from a source mutually terminating a communication link therewith.

BRIEF DESCRIPTION OF THE DRAWINGS

Aspects of the present disclosure are best understood from the following detailed description when read with the accompanying figures, in which:

FIG. 5 is a diagrammatic representation of an exemplary fixed temporal sub-sampling routine implemented in accordance with an embodiment;

FIG. 9 is a diagrammatic representation of a frame buffering sequence featuring a fixed and automatic tile-based temporal sub-sampling routine implemented in accordance with an embodiment;

DETAILED DESCRIPTION

Figure 1:
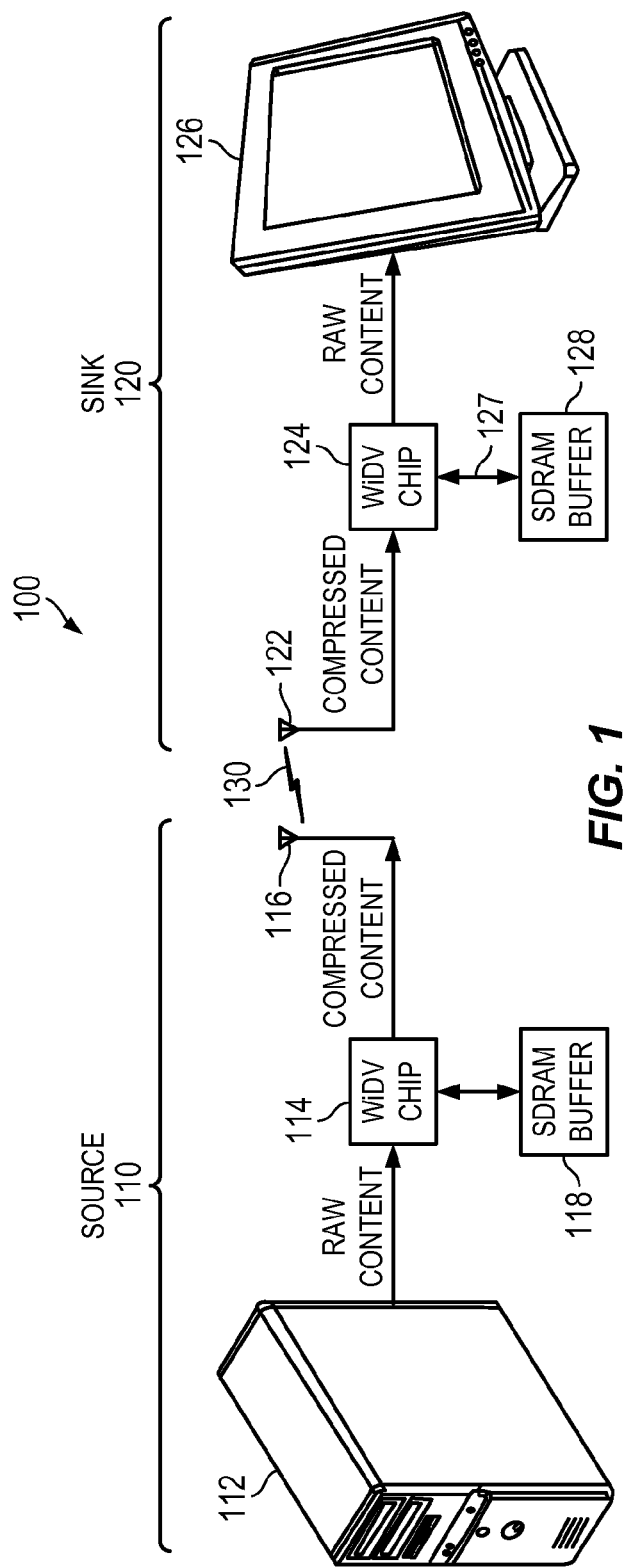
FIG. 1 is a diagrammatic representation of an ultra-wideband system in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of a UWB system 100 in which embodiments disclosed herein may be implemented. A source 110 may include a content originator 112, such as a computational device, a set-top apparatus, or another suitable device. Source 110 may include or otherwise interface with a Wireless Digital Video (WDV) subsystem 114 that includes or is coupled with a source transceiver 116.

Originator 112 may transmit uncompressed or raw content, e.g., RGB or YUV video content, to WDV subsystem 114. WDV subsystem may compress and packetize the raw content and transmit the compressed content to source transceiver 116. Source transceiver 116 is adapted to communicatively engage sink 120 via an RF link 130 and may thereby transmit the compressed content to a sink transceiver 122 that, in turn, conveys the compressed content to WDV subsystem 124. WDV subsystem 124 is adapted to decapsulate and decompress the video content thereby producing raw content that may be transmitted to a sink display device 126 for output of the uncompressed video content. In accordance with an embodiment, source 110 may optionally include a synchronous dynamic random access memory (SDRAM) interface 117 to support an external SDRAM buffer 118 for storing compressed frame data such that memory bandwidth may be minimized. In a similar manner, WDV subsystem 124 of sink 120 may include an SDRAM interface 127 to support an external SDRAM buffer 128 for storing compressed frame data.

Figure 2:
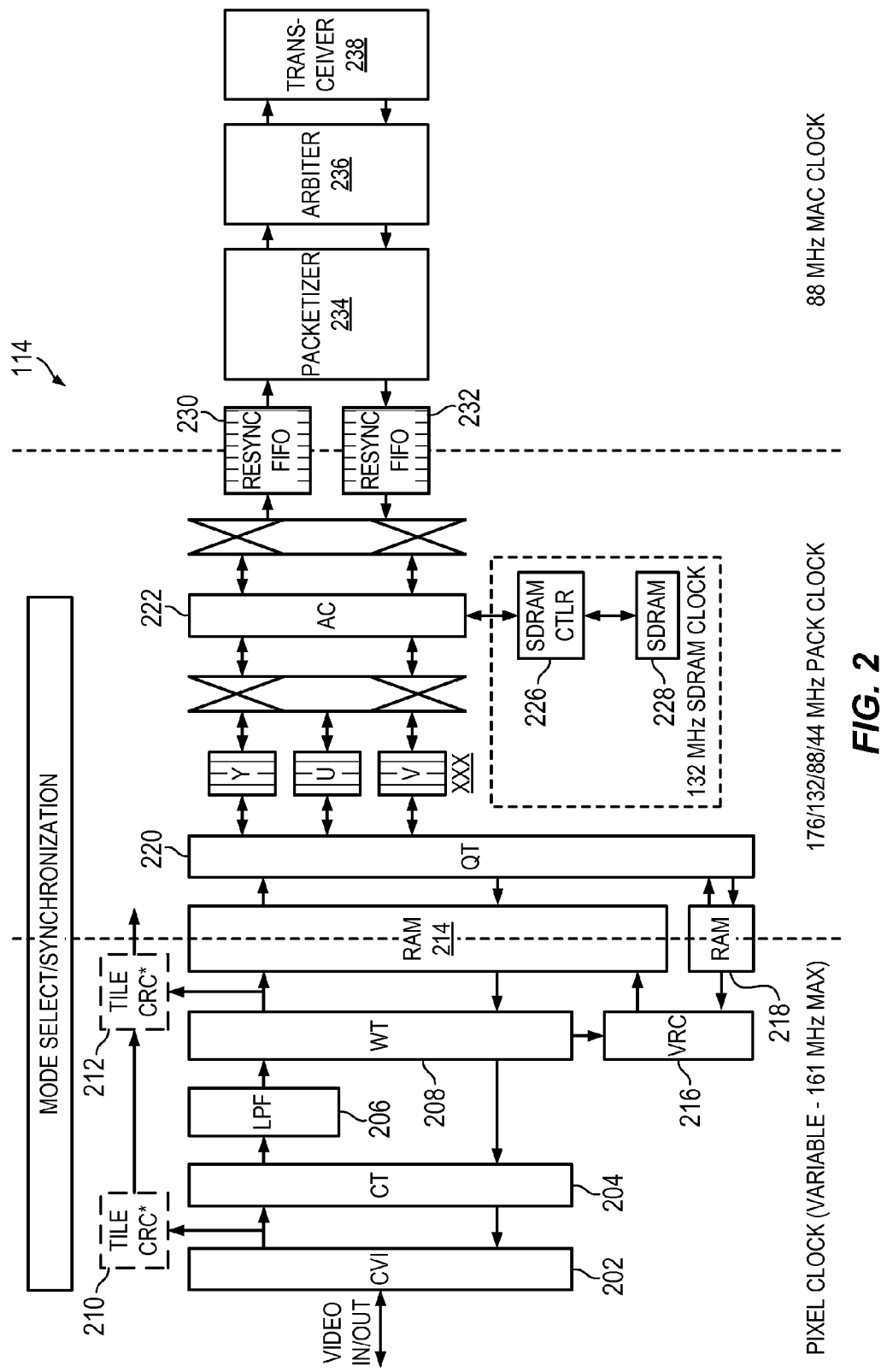
FIG. 2 is a diagrammatic representation of Wireless Digital Video subsystem as implemented in accordance with an embodiment.

FIG. 2 is a diagrammatic representation of WDV subsystem 114 as implemented in accordance with an embodiment. WDV subsystem 124 may be similarly implemented. WDV subsystem 114 may include a configurable video interface (CVI) 202 that may be coupled with a video input over which CVI 202 may receive raw content, e.g., from originator 112. For example, a video input of CVI 202 may be coupled with a video output of a graphics card or chip of a computer or a video output of a set-top box. When subsystem 114 is configured as a WDV subsystem of a sink, CVI 202 may be coupled with a video output over which CVI 202 may output raw content, e.g., to display device 126. For example, a video output of CVI 202 may be coupled with a video input of a graphics card or chip of a computer or video input of a set-top box that drives display device 126. Video content received by CVI 202 may be in an uncompressed format, such as 24-bit RGB or YUV pixel data. CVI 202 may partition received video content into video frame subsets referred to herein as tiles that are independently processed in WDV subsystem

114. A tile comprises N consecutive lines of a frame, and a plurality, M, of tiles constitute a video frame. The number, N, of lines in a tile, and thus the number, M, of tiles per frame, may be configurable at CVI 202.

In the event that the raw data is received by CVI 202 as RGB pixel data, CVI 202 may pass the data to a color transform (CT) module 204 for conversion of the RGB data to YUV data to facilitate enhanced compression of the video content. The chrominance components, i.e., the UV data, may then be conveyed to a low pass filter (LPF) 206 for sub-sampling thereby. In the event that raw data is received by CVI 202 as YUV data, the YUV data may be partitioned by CVI 202 and passed directly to LPF 206. The pixel data including the luma (Y) and chrominance components may then be conveyed to a wavelet transform (WT) module 208 comprising low-pass, band-pass, and high-pass filters thereby producing low-pass, band-pass, and high-pass sub-bands for each respective YUV component. The nine sub-bands may then be written to a random access memory (RAM) 214, or other suitable memory component, where the sub-bands are read by a quantization (QT) module 220 and quantized, e.g., right shifted, thereby. A video rate controller (VRC) may interface with WT 108 and RAM 214 and 218 for providing variable bitrates of the data. The quantized data may then be supplied to, and encoded by, arithmetic coder (AC) 222 that interfaces with an external SDRAM controller 226 for buffering frames in external SDRAM 228. In accordance with an embodiment, tiles partitioned from frames may be buffered in SDRAM 228 prior to conveying the tiles to a resynchronization first-in first-out (FIFO) queue 230 that is coupled with a packetizer 234 for packetizing frames and/or frame tiles in accordance with an embodiment prior to transmission of the packetized data via arbiter 236 over a transceiver 238.

In accordance with an embodiment, a cyclic redundancy check (CRC) function may be deployed for performing a CRC on a tile-by-tile basis. For example, a CRC function 210 may perform a CRC on the raw tile video data, or a CRC function 212 may alternatively be deployed at the output of WT 208 for calculating CRC values of the wavelet transformed data. CRC calculations made on a tile-by-tile basis facilitate a tile copying mechanism implemented in accordance with an embodiment as described more fully hereinbelow.

On a return path, packetized data may be received by the transceiver, conveyed to packetizer 234 via arbiter 236, and depacketized by packetizer 234. The depacketized data may then be conveyed to a resynchronization FIFO queue 232 that may write the data to SDRAM 228. AC 222 may decode the encoded data in SDRAM buffer 228. The decoded data may then be decompressed via QT 220, WT 208, and CT 204 where the data is supplied to CVI 202 as raw data. CVI 202 may then supply the raw data to a display device or other sink via an output port coupled with CVI 202.

Figure 3:
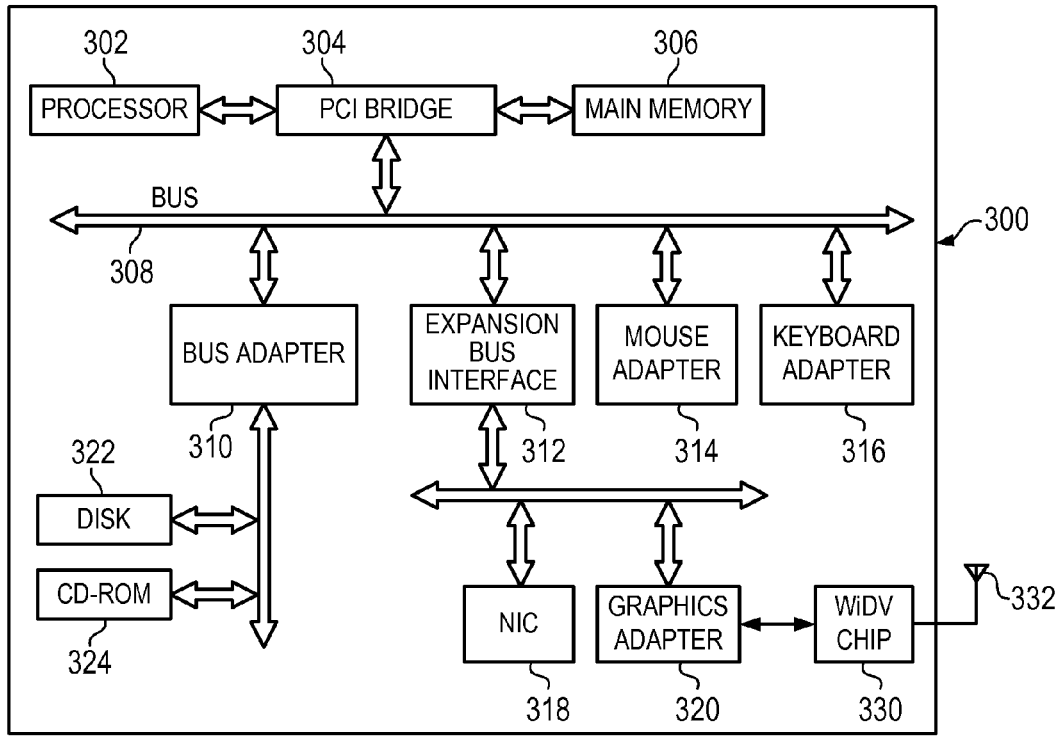
FIG. 3 is a diagrammatic representation of an exemplary data processing system in which embodiments disclosed herein may be implemented.

FIG. 3 is a diagrammatic representation of an exemplary data processing system 300, such as originator 108, depicted in FIG. 1 in which embodiments disclosed herein may be implemented.

Code or instructions implementing processes of embodiments disclosed herein may be located or accessed by system 300. In the illustrative example, system 300 employs a PCI local bus architecture, although other bus architectures, such as the Industry Standard Architecture (ISA), may be used. A processor system 302 and a main memory 306 are connected to a PCI local bus 308 through a PCI bridge 304. PCI bridge 304 also may include an integrated memory controller and cache memory for a processor 302. Additional connections to PCI local bus 308 may be made through direct component interconnection or through add-in connectors. In the depicted example, a small computer system interface (SCSI) host bus adapter 310, an expansion bus interface 312, a mouse adapter 314, and a keyboard adapter 316 are connected to PCI local bus 308 by direct component connection. In contrast, a graphics adapter 318 and a NIC 320 are connected to PCI local bus 308 via expansion bus interface 312 by add-in boards inserted into expansion slots. NIC 320 provides an interface for connecting console 112 with other devices in system 100 depicted in FIG. 1. Expansion bus interface 312 provides a connection for various peripheral devices. SCSI host bus adapter 310 provides a connection for a hard disk drive 322, and a CD-ROM drive 324. Typical PCI local bus implementations may support a plurality of PCI expansion slots or add-in connectors.

In accordance with an embodiment, a WDV chip 330 may be deployed in system 300 that is communicatively coupled with graphics adapter 320 for receiving uncompressed, or raw, content, such as video, therefrom and may be adapted to compress the raw content for transmission to a sink. WDV chip 330 provides a WDV subsystem similar to that depicted in FIG. 2 and may be implemented as a CMOS integrated circuit (IC) combining a baseband physical layer (PHY), media access control (MAC) engine, high-speed security processor, quality of service (QoS) manager and a variety of host interfaces that provides a universal serial bus (USB) subsystem. WDV chip 330 may have an output coupled with a transceiver 332 for wireless transmission and reception of compressed content. Transceiver 332 may be implemented as a chip providing a radio frequency (RF) transceiver. WDV chip 330 and transceiver 332 may optionally be deployed on a common IC and together may provide an on-silicon UWB subsystem.

An operating system runs on processor 302 and is used to coordinate and provide control of various components within system 300. Instructions for the operating system and applications or programs are located on storage devices, such as hard disk drive 322, and may be loaded into main memory 306 for execution by processor 302.

In accordance with embodiments disclosed herein, the requisite throughput for transmission of video or other content over a radio frequency link is advantageously reduced by mechanisms implemented in a WDV subsystem of a host device. In one implementation, a temporal sub-sampling routine that limits the number of frames, or portions thereof, to be transmitted to a sink over an RF link is disclosed. In other embodiments, a tile copying mechanism may be implemented for reducing the throughput of the RF link.

Figure 4:
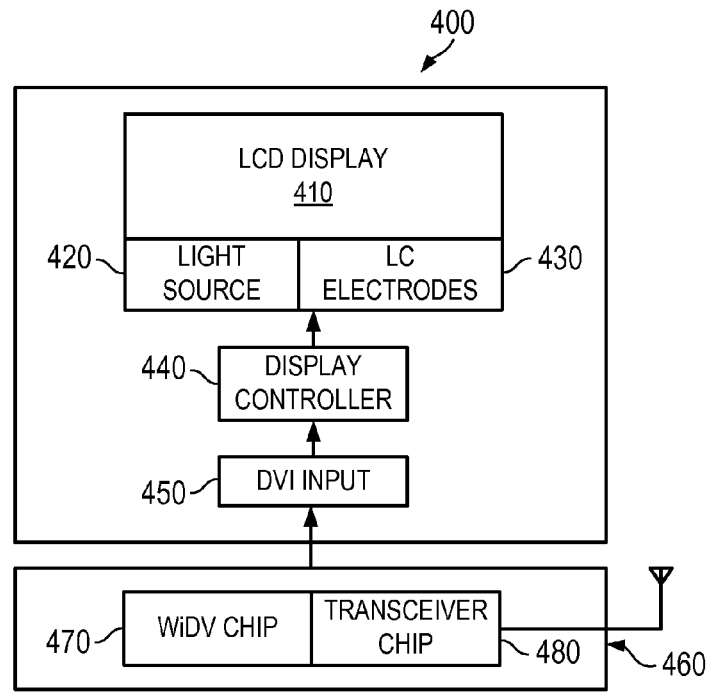
FIG. 4 is a diagrammatic representation of a display device that may comprise a sink implemented in accordance with an embodiment.

FIG. 4 is a diagrammatic representation of a display device 400 that may comprise a sink implemented in accordance with an embodiment. Display device 400 includes a display 410, such as a liquid crystal display (LCD), a plasma display panel, a cathode ray tube, or another suitable display apparatus. In the present example, display device 400 comprises an LCD display device. Accordingly, display device 400 may include a light source 420 and LCD electrodes 430 controlled by a display controller 440. Display controller 440 receives a video signal via an input 450, such as a digital video input (DVI), and is decoded thereby, and controller 440 drives light source 420 and LCD electrodes 430 accordingly.

In accordance with an embodiment, display device 400 may be adapted with a WDV subsystem 460 comprising a WDV chip 470 and a transceiver chip 480. WDV subsystem 460 may be implemented in a similar manner as that depicted and described in FIG. 2. In other implementations, WDV chip 470 and transceiver chip 480 may be deployed on a common chip. In the illustrative example, WDV subsystem 460 interfaces with display device 400 via DVI input 450. Thus, WDV subsystem 460 may be fabricated in a chassis or other package that includes a mateable interface for coupling with DVI input 450. In other embodiments, WDV subsystem 460 may be fabricated in display device 400.

In operation, WDV subsystem 460 receives compressed and encapsulated video content via transceiver chip 480 from a source, such as system 300 depicted in FIG. 3, over an RF link. WDV chip 470 decapsulates and decompresses the received content to produce a raw video signal that is then transmitted to display controller 440 via DVI input 450 for output of the content on display 410 in accordance with embodiments described more fully hereinbelow.

In accordance with embodiments, mechanisms for reducing the amount of data transmitted on the RF link terminated by the source and sink are provided. In one embodiment, a temporal sub-sampling routine may have a fixed, or static, sub-sampling rate that specifies the rate at which frames are discarded. For example, a sub-sampling rate, N, specifies that 1 of N received frames are to be encoded and transferred over the link, while the remaining N−1 frames are to be discarded. The sub-sampling rate may be configurable. In accordance with another embodiment, an automatic temporal sub-sampling mechanism is provided. In this implementation, a source-side external frame buffer, e.g., SDRAM buffer 228, may be evaluated upon receipt of a frame to determine if the frame buffer has capacity for the newly received frame. In the event that the frame buffer has insufficient capacity for buffering the newly received frame, the newly received frame may be automatically discarded. In an embodiment, a sub-sampling mechanism including fixed sub-sampling and automatic sub-sampling is provided. The automatic sub-sampling effectively increases the fixed sub-sampling rate based on the available wireless throughput.

FIG. 5 is a diagrammatic representation of an exemplary temporal sub-sampling (TSS) routine implemented in accordance with an embodiment. The illustrative example depicts a source buffer capacity 510 as an ordinate of "Full" and "Not Full," wherein a buffer capacity of "Not Full" indicates a buffer capacity sufficiently large for storing a frame (or a compressed version thereof), and a buffer capacity of "Full" indicates a buffer capacity that is insufficient for storing a frame (or a compressed version thereof). The buffer capacity may be evaluated upon receipt of a frame for processing. In the event that the buffer capacity is evaluated as Not Full, the received frame may be encoded and buffered. In the event the buffer capacity is evaluated as Full, the received frame may be discarded. A sequence of frames 520-530 is received over a time period t by the source to be processed for transmission over a wireless link to a sink.

Assume the source is configured with a fixed sub-sampling rate of N=2. That is, the source is configured to encode and transfer every other received frame to the sink with alternative frames being discarded or otherwise ignored on the source-side. Accordingly, frames 520 and 524 are buffered for transmission while adjacent frames 522 and 526 are discarded or otherwise ignored (as illustratively designated with dashed lines) according to the fixed temporal sub-sampling rate of N=2.

In the illustrative example, the capacity of the frame buffer is reduced below the requisite capacity for storing another frame upon receipt and buffering of frame 520 as indicated by buffer capacity 510 at time $t_1$. The buffer capacity is increased as frame(s) are read out of the buffer and returns to a capacity sufficient for buffering another frame at a time $t_2$. In a similar manner, the capacity of the frame buffer is reduced below the requisite capacity for storing another frame upon receipt and buffering of frame 524. In this instance, the buffer capacity does not return to a capacity sufficient for buffering another frame until time $t_5$. However, receipt of frame 528 commences at a time $t_4$ at which the buffer capacity is insufficient for storing another frame. Notably, in this instance frame 528 is not scheduled to be discarded according to the fixed temporal sub-sampling rate. In accordance with an embodiment, automatic temporal sub-sampling may evaluate buffer capacity 510 upon receipt of a frame. In the event that the buffer capacity is evaluated as insufficient for storing the received frame, the frame may be automatically discarded. Thus, in the present example, frame 528 is discarded upon a determination that the buffer capacity is insufficient for storing a frame at time $t_4$, i.e., the time at which receipt of frame 528 commences. Frame 530 may be buffered according to the fixed temporal sub-sampling rate because the buffer capacity is returned to a sufficient capacity at a time $t_5$.

Figure 6:
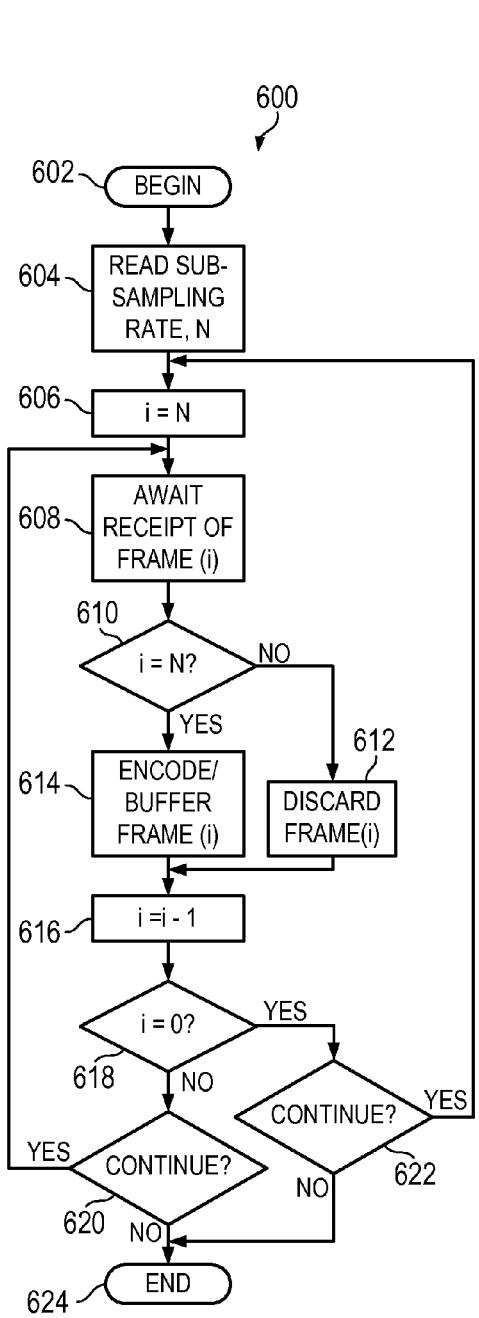
FIG. 6 is a flowchart depicting processing of a fixed temporal sub-sampling routine implemented in accordance with an embodiment.

FIG. 6 is a flowchart 600 depicting processing of a fixed temporal sub-sampling routine implemented in accordance with an embodiment. The fixed temporal sub-sampling routine may be implemented by logic included in, for example, CVI 202 depicted in FIG. 2 of a WDV sub-system deployed on a system source. The sub-sampling routine is invoked (step 602), and the sub-sampling rate, N, is read (step 604). The sub-sampling rate specifies that 1 of N received frames are to be encoded and buffered for transmission to the sink, while the remaining N−1 received frames are to be discarded or otherwise ignored. A counter variable, i, may then be set to the sub-sampling rate, N (step 606). The sub-sampling routine may then await receipt of a frame(i) (step 608). On receipt of frame(i), an evaluation may be made to determine if the counter variable, i, is equal to the sub-sampling rate, N (step 610). In the event that the counter variable, i, is not equal to the sub-sampling rate, N, the current frame(i) may be discarded or otherwise ignored (step 612), and the sub-sampling routine may proceed to decrement the counter variable (step 616). Returning again to step 610, in the event that the counter variable is equal to the sub-sampling rate, the current frame(i) may be encoded and buffered (step 614), and the counter variable may thereafter be decremented according to step 616.

After the counter variable is decremented according to step 616, the sub-sampling routine may proceed to evaluate whether the counter variable is equal to zero (step 618) thereby indicating a complete sub-sampling cycle has completed. In the event that the counter variable is not equal to zero, an evaluation of whether the sub-sampling routine is to continue may be made (step 620). In the event that the sub-sampling routine is to continue, processing may return to await receipt of a next frame(i) according to step 608. If it is determined that processing is not to continue, the sub-sampling routine cycle may end (step 624).

Returning again to step 618, in the event that the counter variable is evaluated as equal to zero, an evaluation may be made of whether the sub-sampling routine is to continue (step 622). In the event that the sub-sampling routine is to continue, processing may return to re-set the counter variable, i, to the sub-sampling rate, N, according to step 606. Alternatively, the sub-sampling routine cycle may end according to step 624.

Figure 7:
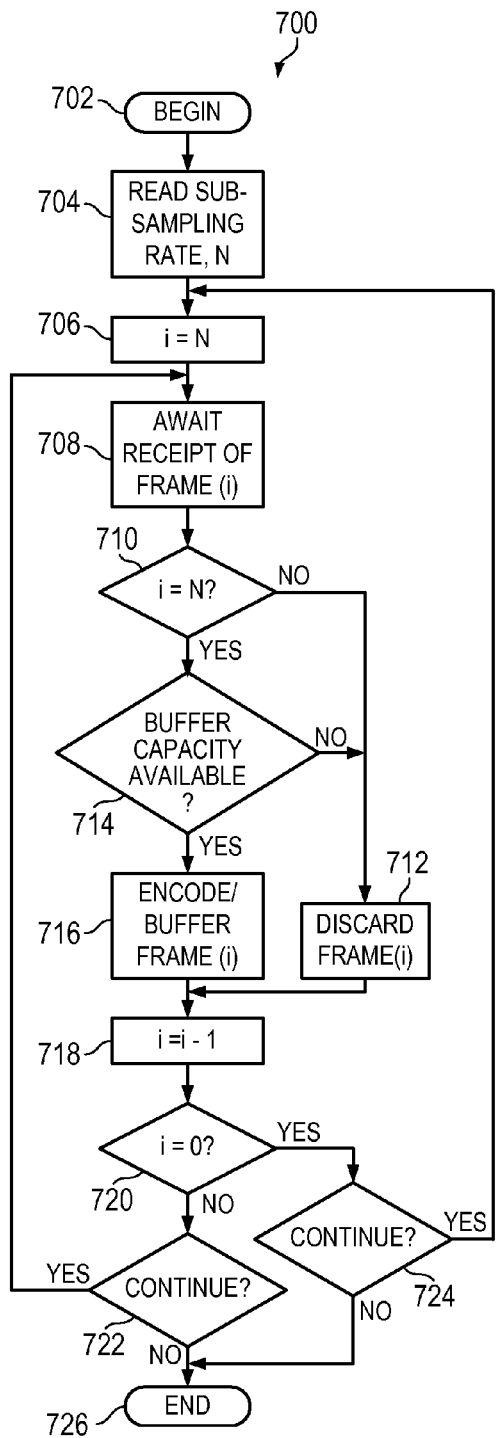
FIG. 7 is a flowchart depicting an exemplary temporal sub-sampling routine featuring both fixed and automatic sub-sampling in accordance with an embodiment.

In accordance with another embodiment, fixed temporal sub-sampling may be supplemented with automatic sub-sampling procedures. FIG. 7 is a flowchart 700 depicting an exemplary temporal sub-sampling routine featuring both fixed and automatic sub-sampling in accordance with an embodiment. The sub-sampling routine depicted in FIG. 7 may be implemented by logic included in CVI 202 depicted in FIG. 2 of a WDV sub-system deployed on a system source.

The sub-sampling routine is invoked (step 702), and the sub-sampling rate, N, is read (step 704). A counter variable, i, may then be set to the sub-sampling rate, N (step 706). The sub-sampling routine may then await receipt of a frame(i) (step 708). On receipt of frame(i), an evaluation may be made to determine if the counter variable, i, is equal to the sub-sampling rate, N (step 710). In the event that the counter variable, i, is not equal to the sub-sampling rate, N, the current frame(i) may be discarded or otherwise ignored (step 712), and the sub-sampling routine may proceed to decrement the counter variable (step 718). Returning again to step 710, in the event that the counter variable is equal to the sub-sampling rate, the frame buffer capacity may be evaluated according to the automatic temporal sub-sampling procedure to determine if sufficient capacity is available for the current frame(i) (step 714). In the event that the frame buffer has insufficient capacity for the current frame(i), the sub-sampling routine may proceed to step 712 and discard the current frame(i). In the event that sufficient capacity is available in the frame buffer, the current frame(i) may be encoded and buffered (step 716), and the counter variable may thereafter be decremented according to step 718.

After the counter variable is decremented according to step 718, the sub-sampling routine may proceed to evaluate whether the counter variable is equal to zero (step 720). In the event that the counter variable is not equal to zero, an evaluation of whether the sub-sampling routine is to continue may be made (step 722). In the event that the sub-sampling routine is to continue, processing may return to await receipt of a next frame(i) according to step 708. If it is determined that processing is not to continue, the sub-sampling routine cycle may end (step 726).

Returning again to step 720, in the event that the counter variable is evaluated as equal to zero, an evaluation may be made to determine whether the sub-sampling routine is to continue (step 724). In the event that the sub-sampling routine is to continue, processing may return to re-set the counter variable, i, to the sub-sampling rate N according to step 706. Alternatively, the sub-sampling routine cycle may end according to step 726.

In accordance with another embodiment, frames may be partitioned into tiles, and temporal sub-sampling may be performed on a tile-by-tile basis. In other embodiments, a tile copying procedure may be employed by a WDV system to provide an enhanced reduction in the requisite throughput of an RF link terminated by a source and sink. In this embodiment, tiles (or parametrics derived therefrom) of sequential frames may be compared to determine if any changes are exhibited by corresponding tiles of the sequential frames. In the event that corresponding tiles of sequential frames are determined to not exhibit any differences between one another, a tile of a subsequent frame may be discarded at the source. On the sink-side, the tile of the early frame in the frame sequence that is identified as not having any difference between a tile of a subsequent frame may be copied and used for display in the subsequent frame as described more fully hereinbelow.

Figure 8:
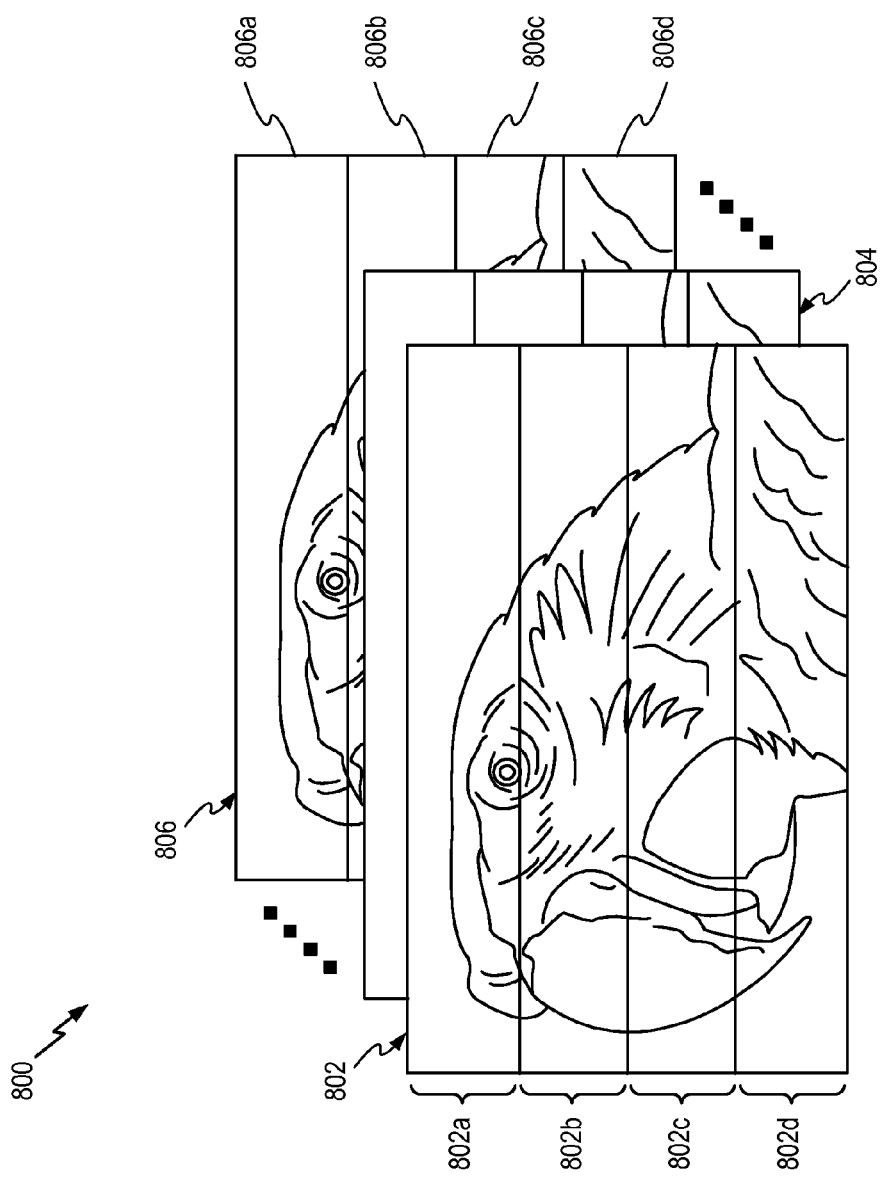
FIG. 8 is a diagrammatic representation of a frame sequence in which frames are partitioned into a plurality of tiles for processing in accordance with an embodiment.

FIG. 8 is a diagrammatic representation of a frame sequence 800 in which frames are partitioned into a plurality of tiles for processing in accordance with an embodiment. Frames 800-806 may be partitioned or split into a plurality, M, of tiles with each tile having a number, N, of lines. In the illustrative example, frame 802 is partitioned into four tiles 802a-802d. Likewise, frames 804-806 may be partitioned into respective sets of tiles 804a-804d (not shown) and 806a-806d. Each of the tiles may comprise a common number of lines of pixel data. Each of tiles 802a-802d through 806a-806d may be encoded and buffered independently of other tiles. Moreover, tiles 802a-802d through 806a-806d may be transmitted to the sink independently of other tiles as described more fully hereinbelow. Tiles that include the same image line numbers of different frames are referred to herein as corresponding tiles. For example, tile 802a includes the first N lines of pixel data of frame 802, and tile 806a includes the first N lines of pixel data of frame 806. Thus, tiles 802a and 806a are said herein to comprise corresponding tiles.

FIG. 9 is a diagrammatic representation of a frame buffering sequence featuring a fixed and automatic tile-based temporal sub-sampling routine implemented in accordance with an embodiment. The illustrative example depicts a source buffer capacity 910 as an ordinate of "Full" and "Not Full" wherein a buffer capacity of "Not Full" indicates a buffer capacity sufficiently large for storing at least a frame tile (or a compressed version thereof), and a buffer capacity of "Full" indicates a buffer capacity that is insufficient for storing at least a frame tile (or a compressed version thereof). The buffer capacity may be evaluated upon receipt of a tile for processing. In the event that the buffer capacity is evaluated as Not Full, the received tile may be encoded and buffered. In the event the buffer capacity is evaluated as Full, the received tile may be discarded along with subsequent tiles of a common frame. A sequence of frames 920-930 is received over a time period t by the source to be encoded and buffered prior to transmission via a wireless link to a sink.

Each of frames 920-930 may be partitioned into a plurality, M, of tiles. In the illustrative example, the partitioned value, M, is set to four, and thus frames 920-930 are partitioned into respective tile sets 920a-920d-930a-930d.

Assume the source is configured with a fixed sub-sampling rate of N=2. That is, the source is configured to encode and transfer every other received frame to the sink with alternative frames being discarded or otherwise ignored on the source-side. Thus, frame 922 is discarded (illustratively designated with dashed line) after receipt, encoding, and buffering of all tiles 920a-920d of frame 920. Frame 924 is scheduled to be encoded and buffered according to the fixed temporal sub-sampling rate of N=2 if buffer capacity permits. In accordance with an embodiment, buffer capacity of a frame is evaluated on a tile-by-tile basis. In the event that buffer capacity is available for a tile, the tile may be encoded and buffered. The buffer capacity may be likewise evaluated for the other remaining frame tiles. In the event that the buffer capacity is insufficient for storing a tile, the tile and any remaining tiles of the current frame may be discarded. Upon receipt of a subsequent frame, the subsequent frame is partitioned, and tiles of the newly received frame that correspond with tiles of the previous frame that were successfully buffered may be discarded or otherwise ignored. The buffer capacity is evaluated for the tile corresponding to the first of the discarded tiles of the previous frame. In this manner, a frame comprising tiles from a plurality of frames may be buffered effectively forming a composite frame made up of constituent tiles of more than one frame.

Returning again to FIG. 9, the capacity of the frame buffer is evaluated on a tile-by-tile basis as discussed above. In the present example, the buffer capacity is evaluated as sufficient for storing each of tiles 924a-924b of frame 924. However, an evaluation of the buffer capacity that is made for tile 924c indicates the buffer capacity is insufficient for storing tile 924c as indicated by buffer capacity 910. Accordingly, tiles 924c-924d are discarded or otherwise ignored (as illustratively designated by dashed lines). Upon receipt and partitioning of the subsequent frame 926, tiles 926a-926b that correspond to buffered tiles 924a-924b of previous frame 924 are discarded or otherwise ignored. An evaluation may then be made of the buffer capacity to determine if there is sufficient capacity for storing tile 926c. In the illustrative example, sufficient buffer capacity is available for tile 926c, and accordingly tile 926 is encoded and buffered. A subsequent evaluation of buffer capacity 910 for tile 926d indicates insufficient capacity for storing a tile, and tile 926d is thus discarded as illustrated with dashed line. On subsequent receipt of a partitioned frame 928, tiles 928a-928c are discarded or otherwise ignored because corresponding tiles 924a-924b and 926c of frames 924 and 926 have previously been encoded and buffered. Hence, an evaluation of buffer capacity 910 is made for tile 928d which is encoded and buffered on an evaluation that sufficient buffer capacity exists. Thus, a single composite frame is buffered that comprises constituent tiles of three sequential frames in the illustrative example.

Figure 10:
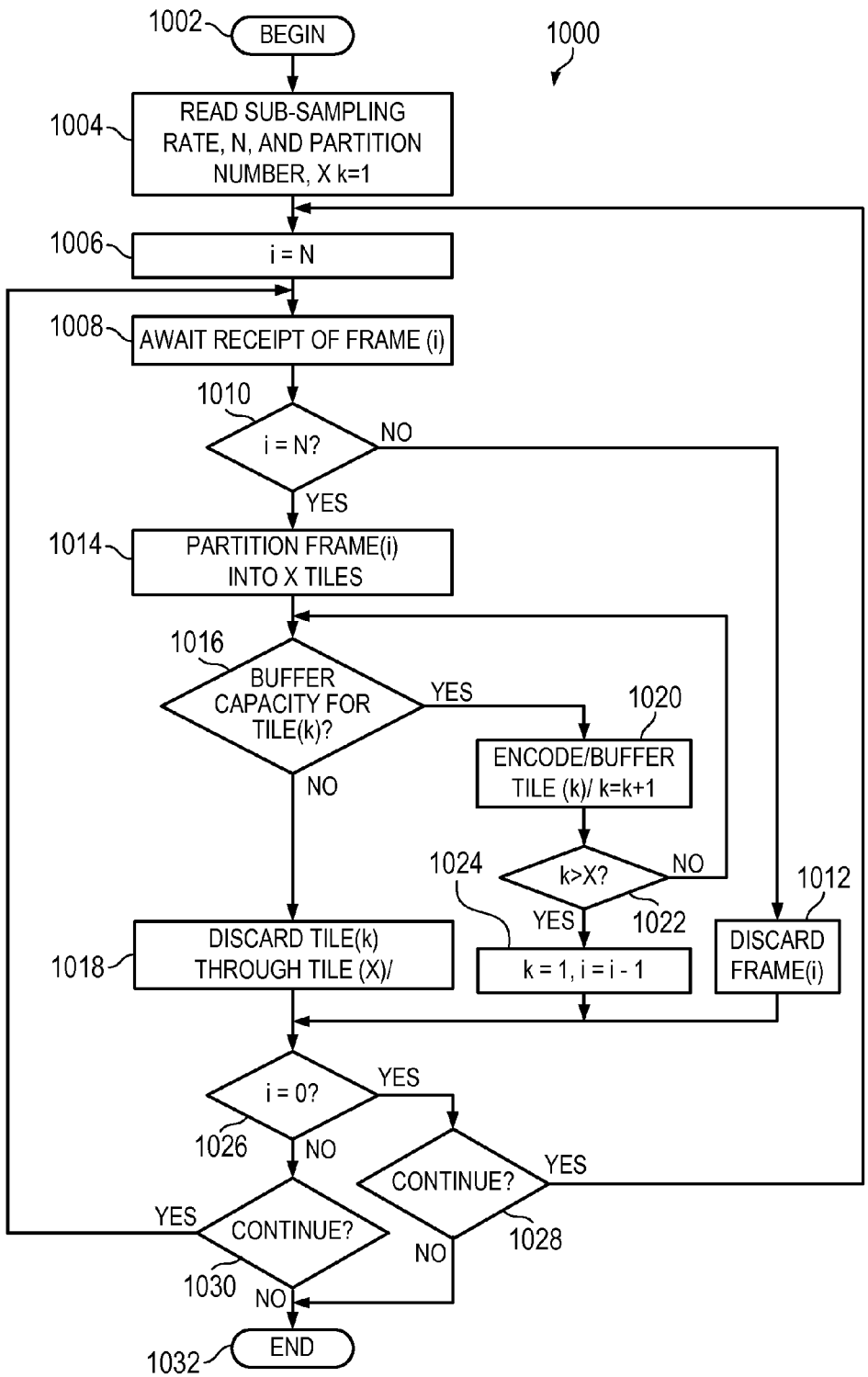
FIG. 10 is a flowchart depicting processing of a temporal sub-sampling routine featuring tile-based fixed and automatic temporal sub-sampling in accordance with an embodiment.

FIG. 10 is a flowchart 1000 depicting processing of a temporal sub-sampling routine featuring tile-based fixed and automatic temporal sub-sampling in accordance with an embodiment. The sub-sampling routine depicted in FIG. 10 may be implemented by logic included in CVI 202 depicted in FIG. 2 of a WDV sub-system deployed on a system source. The sub-sampling routine is invoked (step 1002), and the fixed sub-sampling rate, N, and a partition number, X, for frame partitioning is read (step 1004). The partition number X specifies the number of tiles frames are partitioned into and may be a configurable value. A counter variable, k, that facilitates tracking of buffered tiles may also be initialized, e.g., to a value of "1" as indicated at step 1004.

A counter variable, i, may then be set to the sub-sampling rate, N (step 1006). The sub-sampling routine may then await receipt of a frame(i) (step 1008). On receipt of frame(i), an evaluation may be made to determine if the counter variable, i, is equal to the sub-sampling rate, N (step 1010). In the event that the counter variable, i, is not equal to the sub-sampling rate, N, the current frame(i) may be discarded or otherwise ignored (step 1012) according to the fixed sub-sampling rate.

Returning again to step 1010, in the event that the counter variable is equal to the sub-sampling rate, frame(i) may be partitioned into X tiles (step 1014). An evaluation may then be made to determine if there is sufficient capacity for buffering a first tile(k) of the partitioned frame (step 1016). If there is insufficient capacity for buffering tile(k), tile(k) through tile (X) may be discarded (step 1018).

Returning again to step 1016, in the event that sufficient buffer capacity is available for buffering tile(k), tile(k) may be encoded and buffered, and the tile counter variable k may be incremented (step 1020). An evaluation may be made to determine if each tile of the current frame has been buffered by comparing the tile counter variable with the partition number X (step 1022). In the event that each tile of the current frame has not been buffered, the sub-sampling routine may return to step 1016 to determine if there is sufficient buffer capacity for storing the next tile(k). In the event that the most recently buffered tile is the last tile of the current frame(i), the tile counter variable k may be reset to "1", and the frame counter variable i may be decremented (step 1024). After the counter variable is decremented according to step 1024, the sub-sampling routine may proceed to evaluate whether the frame counter variable, i, is equal to zero (step 1026) thereby indicating that the next frame is scheduled to be buffered according to the sub-sampling rate N. In the event that the counter variable i is not equal to zero, an evaluation of whether the sub-sampling routine is to continue may be made (step 1030). In the event that the sub-sampling routine is to continue, processing may return to await receipt of a next frame(i) according to step 1008. If it is determined that processing is not to continue, the sub-sampling routine cycle may end (step 1032).

Returning again to step 1026, in the event that the counter variable, i, is evaluated as equal to zero, an evaluation may be made to determine whether the sub-sampling routine is to continue (step 1028). In the event that the sub-sampling routine is to continue, processing may return to re-set the frame counter variable, i, to the sub-sampling rate N according to step 1006. Alternatively, the sub-sampling routine cycle may end according to step 1032.

In accordance with another embodiment, additional throughput reduction is achieved by a tile copying mechanism. At the video source, a cyclic redundancy check (CRC), or other suitable parametric evaluation, is performed on each tile of partitioned frames. The CRC may be calculated on the tile's raw pixel data or the tile's wavelet transformed data by respective CRC function 210 and 212 depicted in FIG. 2. The CRC may then be stored at the source. On an initial frame of a sequence of video frames, all tiles of the initial frame are considered "new" and thus are to be processed and transferred to the sink. After the initial frame, corresponding tiles of subsequent frames may be discarded or otherwise ignored, and thus not transferred to the sink, if the subsequent tile is determined to not differ from the corresponding tile of the previous frame. For example, returning again to FIG. 8, assume frame 802 comprises a first frame of a sequence of frames to be transmitted to a sink. If tile 804a of frame 804 that is subsequent to frame 802 does not differ from corresponding tile 802a of frame 802, then tile 804a may be discarded or otherwise ignored at the source-side. Advantageously, the requisite data to be transmitted from the source to the sink is reduced. In an embodiment, CRC values calculated for tiles of a frame are respectively compared to CRC values of corresponding tiles of a preceding frame to determine if the tiles have changed, and only tiles that are determined to have changed with respect to a corresponding tile of a previous frame are encoded and transmitted to the sink.

Figure 11:
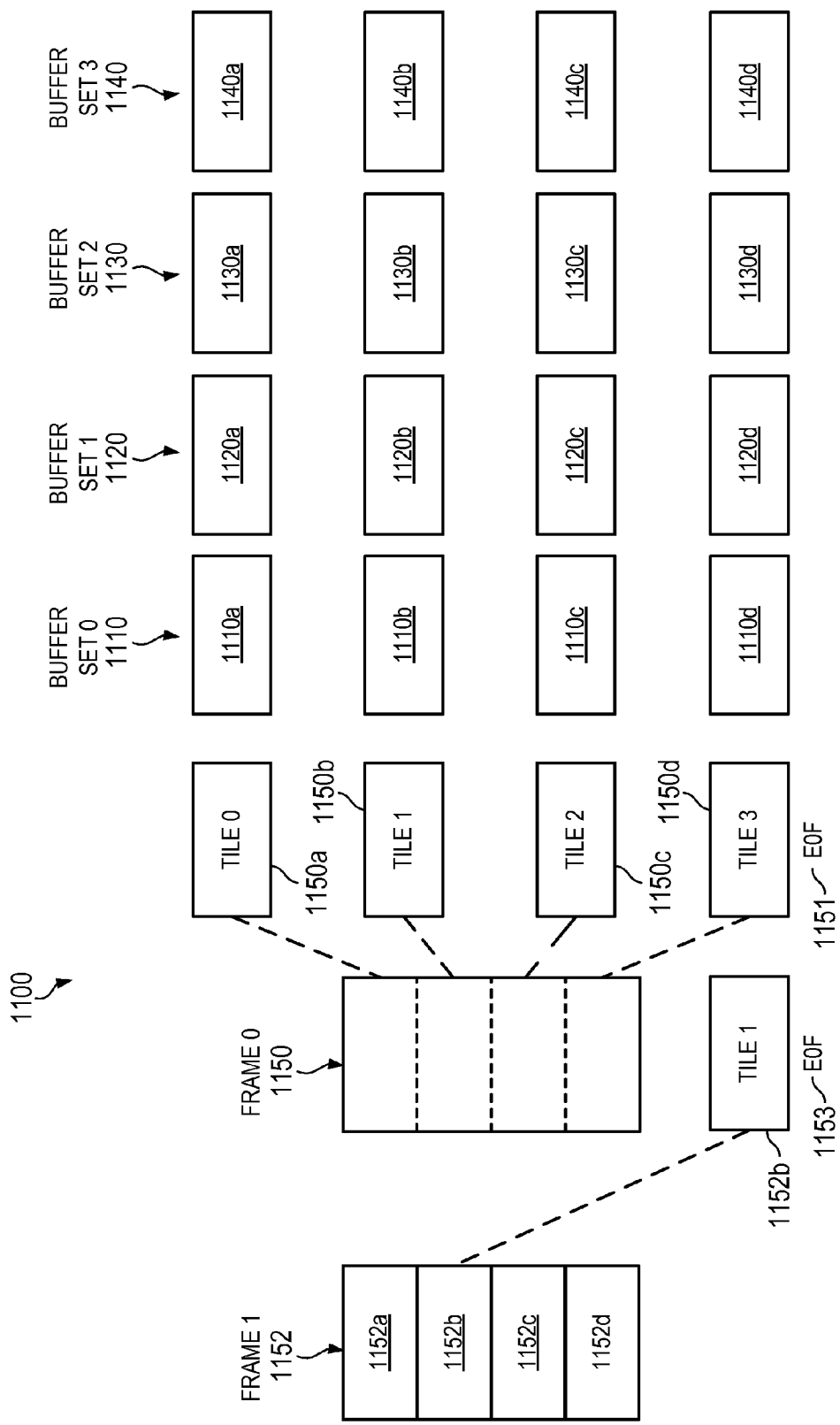
FIG. 11 a diagrammatic representation of a sink buffer configuration implemented in accordance with an embodiment.

To facilitate the tile copying mechanism disclosed herein, the sink may be provided with multiple buffers for buffering received tiles. With reference now to FIG. 11, a diagrammatic representation of a sink buffer configuration 1100 implemented in accordance with an embodiment is depicted. Continuing with the above example of frames that are partitioned into four tiles, each of buffer sets 1110-1140 each include four buffers allocated for one of the four tiles of partitioned frames. In the present example, the sink includes a buffer set 1110 comprising a plurality of buffers 1110a-1110d each respectively associated with one of a plurality, X, of tiles of partitioned frames. In a similar manner, buffer set 1120 comprises buffers 1120a-1120d each assigned to a respective one of the X tiles, buffer set 1130 comprises buffers 1130a-1130d each assigned to a respective one of the X tiles, and buffer set 1140 comprises buffers 1140a-1140d each assigned to a respective one of the X tiles. As tiles of a frame are received at the sink, the sink may write the tiles to respective buffers of a particular buffer set, e.g., buffer set 1110. The sink may then cycle to a next buffer set, e.g., buffer set 1120, for writing of tiles of frames of a subsequent frame received by the sink. The sink may continue to cycle through the buffer sets until tiles of a received frame are written to buffer set 1140 at which time the sink returns to buffer set 1110 for writing tiles of another received frame. The buffer configuration comprising buffer sets 1110-1140 may be maintained in SDRAM buffer 228 of a WDV subsystem deployed at a sink.

To facilitate processing of received frames and constituent tiles thereof, the sink may include pointers that reference a particular tile and corresponding buffer. In accordance with an embodiment, the sink includes a set of write buffer pointers, next buffer pointers, and current buffer pointers. Write buffer pointers reference buffers that store tiles of a frame that are in the process of being received by the sink and are therefore not ready for display by the sink. In a similar manner, next buffer pointers reference buffers that store tiles of a frame having tiles that are all received by the sink and thus are ready for processing for display by the sink. That is, the next buffer pointers reference tiles of a frame that is to be displayed following the currently displayed frame. Current buffer pointers reference buffers that store tiles of a frame that is currently displayed by the sink.

FIGS. 12A-12E depict diagrammatic representations of exemplary buffer pointers maintained by a sink for referencing constituent tiles of frames received thereby in accordance with an embodiment. In the illustrative examples of FIGS. 12A-12E, pointers comprise a tile identifier and a reference to a buffer set in which the tile is stored. Particularly, buffer pointers are illustratively designated X.Y, with X representing a tile indicator and Y representing a buffer set in which the corresponding tile is stored.

As noted above, each tile of a first frame of a frame sequence is transmitted to the sink and is stored in a particular buffer set. For example, assuming frame 1150 depicted in FIG. 11 comprises a first frame of a frame sequence, each tile 1150a-1150d may be stored in a respective buffer 1110a-1110d of buffer set 1110 as the tiles are received at the sink. Accordingly, as tiles 1150a-1150d are stored in respective buffers 1110a-1110d, write buffer pointers 1210a-1210d are populated with pointer values referencing tiles 1150a-1150d and buffer set 1110 (illustratively designated Buffer Set 0). For instance, write buffer point 1210a has a value "0.0" indicating tile 0, i.e., 1150a, is stored in buffer set 0, i.e., buffer set 1110. Thus, write buffer pointer 1210a indicates the first tile 1150a is stored in buffer 1110a of buffer set 1110. In a similar manner, write buffer pointers 1210b-1210d have pointer values of "1.0", "2.0", and "3.0" thus indicating that the currently received tiles 1150b-1150d (tile 1 through tile 3) of frame 1150 are stored in corresponding buffers of buffer set "0".

Figure 12A:
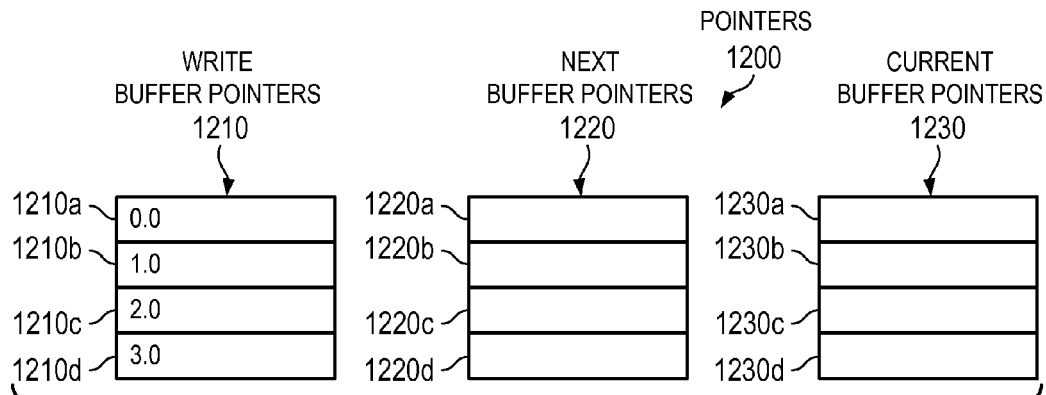
FIGS. 12A-12E depict diagrammatic representations of exemplary buffer pointers maintained by a sink for referencing constituent tiles of frames received thereby in accordance with an embodiment.
Figure 12B:
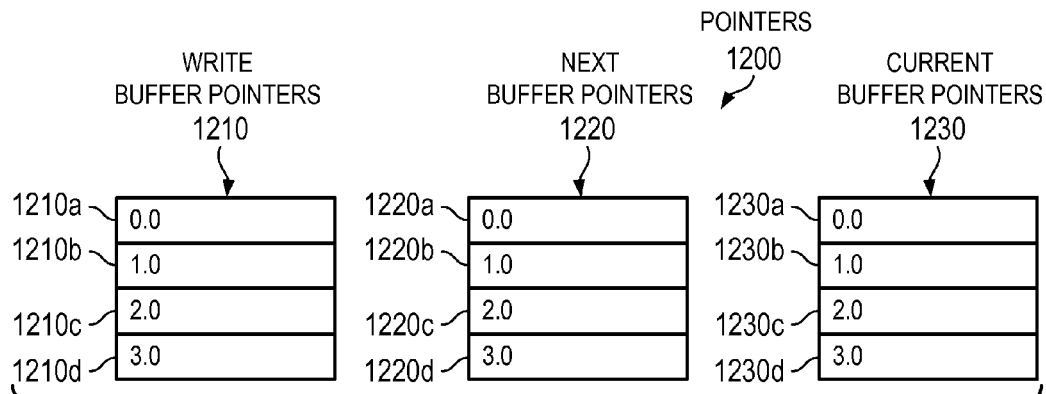

An end of frame (EOF) flag 1151 may be transmitted with, or subsequent to, transmission of the final tile 1150d of frame 1150. EOF flag 1151 provides an indication to the sink that a complete frame has been transmitted thereto, and subsequent tiles received thereby comprise tiles of another frame. Accordingly, on receipt of EOF 1151, the frame comprising tiles 1150a-1150d has been completely received by the sink and may be processed for display by the sink. Accordingly, the pointer values of write buffer pointers 1210 may be copied to corresponding next buffer pointers 1220 as depicted in FIG. 12B. Additionally, because frame 1150 comprises a first frame of a frame sequence, the next buffer pointers 1220 may be copied to corresponding current frame pointers 1230 as depicted in FIG. 12B. Accordingly, the sink may then read tiles 1150a-1150d via respective current frame pointers 1230a-1230d, process the tiles, and display the frame comprising constituent tiles 1150a-1150d.

Figure 12C:
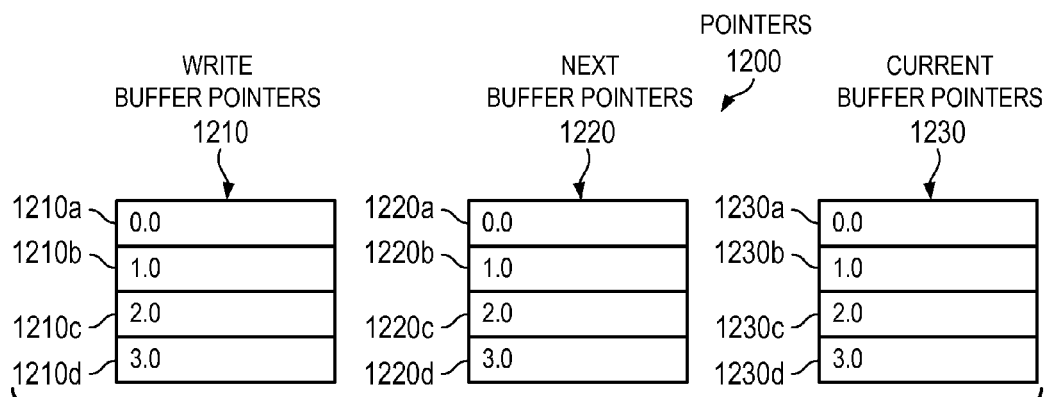
Figure 12D:
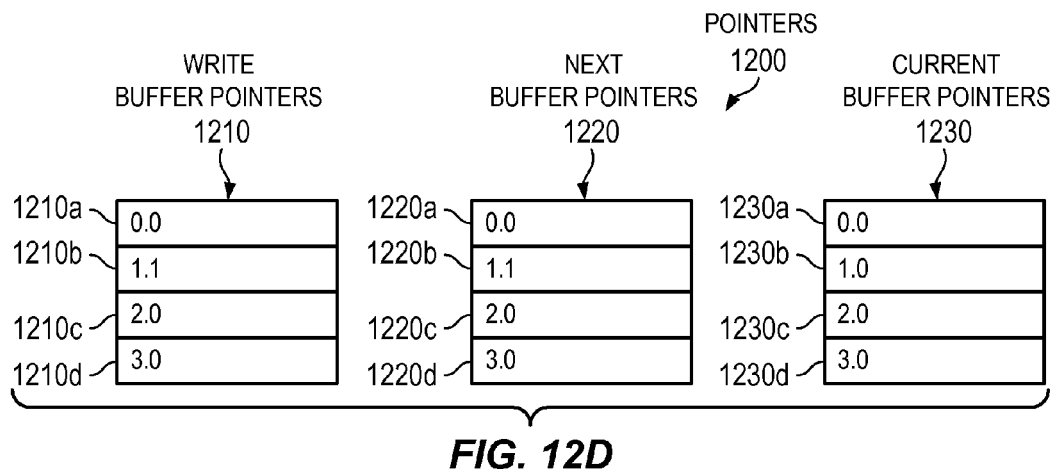
Figure 12E:
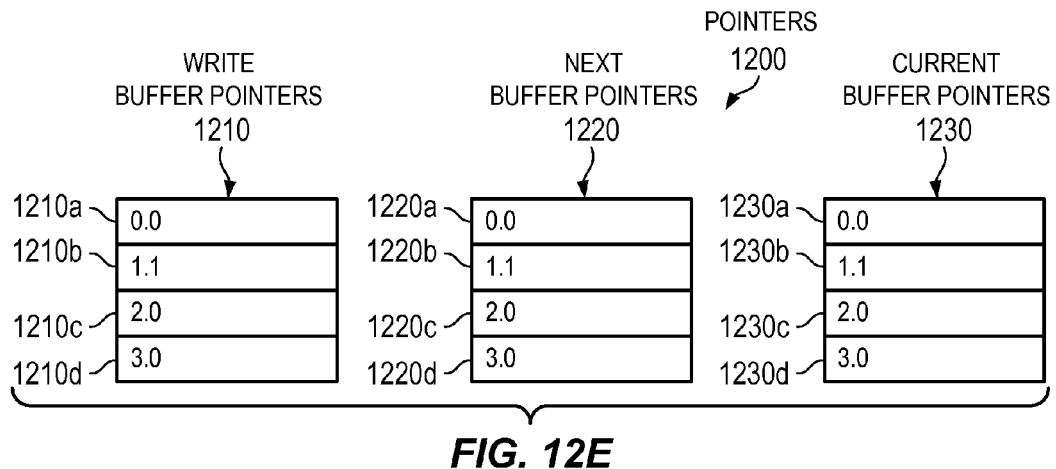

Continuing with the present example, assume a second frame 1152 is to be transmitted to the sink. Further assume that the source has determined that tiles 1152a and 1152c-1152d are identical to respective corresponding tiles 1150a and 1150c-150d of previous frame 1150. Accordingly, the source may discard tiles 1152a and 1152c-1152d (as illustratively designated by cross hatches), and transmit only tile 1152b and an EOF flag 1153. On receipt of tile 1152b, the sink may write tile 1152b to buffer set 1120. In particular, the sink may write tile 1152b to buffer 1120b allocated for tiles designated tile 1 of partitioned frames. When tile 1152b is written to buffer 1120b, a value of "1.1" may be assigned to write pointer 1210b of the sink as depicted in FIG. 12C indicating that a tile 1 of the frame currently being received is stored in buffer set 1120, i.e., buffer set 1. Receipt of EOF flag 1153 by the sink indicates to the sink that all requisite tiles necessary for display of frame 1152 have been transmitted to the sink. Accordingly, the sink may then copy write buffer pointers 1210 to next buffer pointers 1220 that reference tiles of a next frame to be displayed as depicted in FIG. 12D. When the sink display processing is ready to display a next frame, e.g., up expiration of a frame interval (e.g., $\frac{1}{60}$ sec.), the next buffer pointers 1220 may be copied to current buffer pointers 1230 as depicted in FIG. 12E. In this instance, the current frame to be displayed referenced by current buffer pointers 1230 comprises a frame that is a composite of tiles of multiple frames, namely tiles 1150a and 1150c-1150d of frame 1150 and tile 1152b of frame 1152. Thus, tiles 1150a and 1150c-1150d have effectively been copied to a subsequent frame for display without requiring re-transmission of the duplicative content of tiles 1152a and 1152c-1152d.

Figure 13:
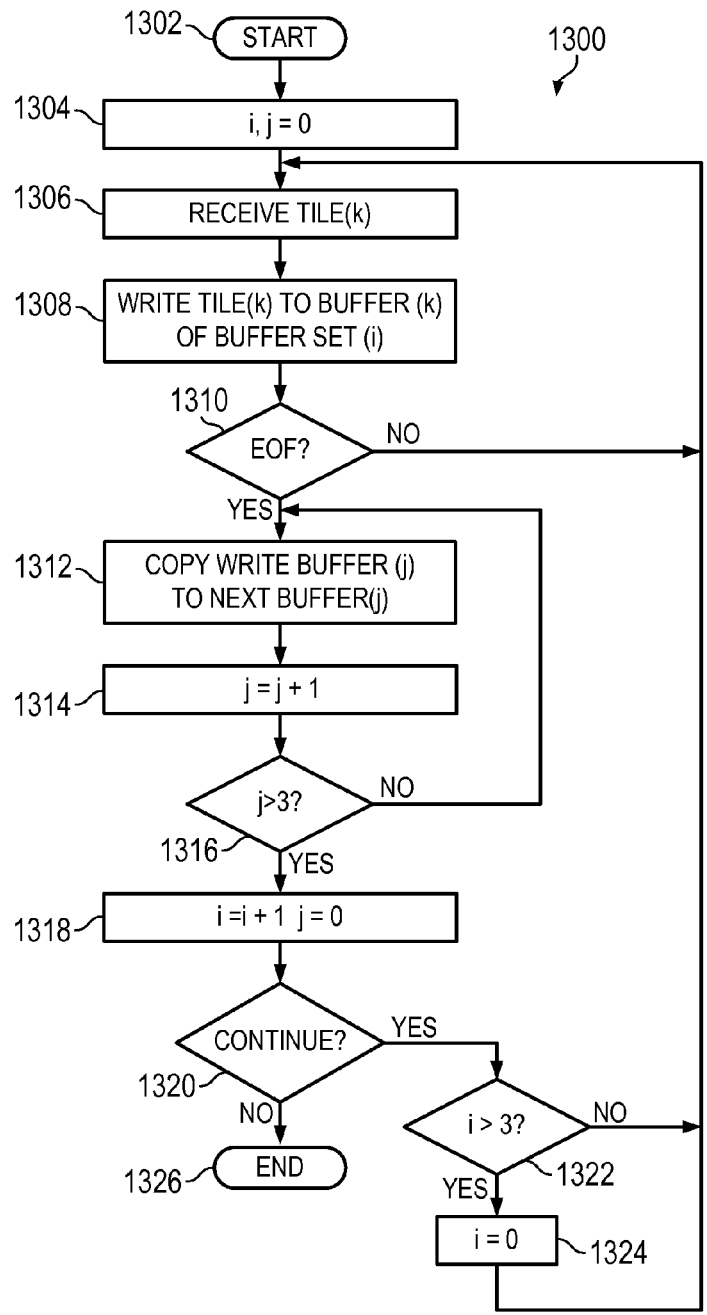
FIG. 13 is a flowchart that depicts processing of a tile copying routine implemented at a sink in accordance with an embodiment.

FIG. 13 is a flowchart 1300 that depicts processing of a tile copying routine implemented at a sink in accordance with an embodiment. The tile copying routine is invoked (step 1302), and a buffer set index variable, i, and a buffer index variable, j, may be initialized to zero (step 1304). The sink may then await receipt of a tile(k) (step 1306). In the illustrative examples provided herein, frames are partitioned into four tiles, and thus a received tile(k) may have an identifier of k(0) through k(3) indicating the tile position within the partitioned frame. On receipt of tile(k), the sink may write tile(k) to a buffer(k) of buffer set(i) (step 1308). An evaluation may then be made to determine if an EOF flag is received indicating that tile(k) is the last tile to be received of the frame being transmitted to the sink (step 1310). In the event that an EOF flag is not received, the sink may return to step 1306 to receive another tile(k). On receipt of an EOF flag, write buffers) may be copied to a corresponding next buffers) (step 1312). The buffer index, j, may then be incremented (step 1314), and an evaluation may then be made to determine if the buffer index exceeds "3" thereby indicating that all write buffers have been copied to corresponding next buffers. If any write buffers remain to be copied to corresponding next buffers, processing may return to step 1312 to copy the write buffers) to a corresponding next buffers).

When all write buffers have been copied to corresponding next buffers, the buffer set index, i, may be incremented, and the buffer index may be reset to zero (step 1318). An evaluation may be made to determine if the tile copying routine is to continue (step 1320). In the event that the tile copying routine is to continue, an evaluation may be made to determine if the buffer set index, i, is greater than three thereby indicating that the last buffer set has been written to (step 1322). In the event that the last buffer set has been written to, the buffer set index, i, may be reset to zero (step 1324), and processing may return to 1306 to receive a tile(k) from another frame. If it is determined that the last buffer set has not been written to at step 1322, the tile copying routine may return to step 1306 to receive a tile(k) from another frame. The tile copying routine may terminate (step 1326) upon an appropriate evaluation at step 1320. Of course, the tile copying routine may terminate anywhere in processing of the routine upon a suitable termination interrupt or other event.

As described, embodiments disclosed herein provide mechanisms for reducing the requisite throughput of an RF link in a UWB system. In one implementation, a temporal sub-sampling routine that limits the number of frames, or portions thereof, to be transmitted to a sink over an RF link is provided. The temporal sub-sampling routine may have a fixed, or static, sub-sampling rate that specifies the rate at which frames are discarded. In accordance with another embodiment, an automatic temporal sub-sampling mechanism is provided. In still other embodiments, a tile copying mechanism may be implemented for reducing the throughput of the RF link. A WDV subsystem may include an interface to an external frame buffer that facilitates the temporal sub-sampling and tile copy routines disclosed herein.

The flowcharts of FIGS. 6, 7, 10, and 13 depict process serialization to facilitate an understanding of disclosed embodiments and are not necessarily indicative of the serialization of the operations being performed. In various embodiments, the processing steps described in FIGS. 6, 7, 10, and 13 may be performed in varying order, and one or more depicted steps may be performed in parallel with other steps. Additionally, execution of some processing steps of FIGS. 6, 7, 10, and 13 may be excluded without departing from embodiments disclosed herein. The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method of buffering frames in a wireless communication system, comprising:
   setting a sub-sampling rate that specifies a rate at which frames are discarded;
   receiving a first sequence of frames for transmission to a sink;
   discarding a portion of the first sequence of frames based on the sub-sampling rate to form a second sequence of frames comprising at least a first frame, the first frame comprising a first plurality of tiles;
   evaluating a capacity of a frame buffer to store a first tile of the first plurality of tiles;
   discarding the first the and any remaining non-buffered tiles of the first plurality of tiles from the second sequence of frames based on the capacity of the frame buffer to form a third sequence of frames; and
   buffering at least a portion of an incoming frame of the third sequence of frames for transmission to the sink.

2. The method of claim 1, further comprising transmitting the incoming frame to the sink.

3. The method of claim 1, wherein the incoming frame is buffered in response to determining the capacity is sufficient for the incoming frame.

4. The method of claim 1, further comprising partitioning the incoming frame into a second plurality of tiles.

5. The method of claim 4, further comprising:
   evaluating the buffer capacity for a compressed version of a second the of the second plurality of tiles; and
   storing the compressed version of the second tile in the buffer in response to determining the buffer capacity is sufficient for storing the compressed version of the second tile.

6. The method of claim 4, further comprising:
   evaluating the buffer capacity for a compressed version of a second tile of the second, plurality of tiles; and
   discarding the second tile and any remaining non-buffered tiles of the second plurality of tiles in response to determining the buffer capacity is insufficient for storing the compressed version of the second tile.

7. The method of claim 6, further comprising:
   discarding a plurality of tiles of a frame subsequent to the incoming frame in the sequence of frames;
   evaluating the buffer capacity for a compressed version of an additional tile of the frame subsequent to the incoming frame; and
   buffering the compressed version of the additional tile of the frame subsequent to the incoming frame in response to determining the buffer capacity is sufficient for storing the compressed version of the additional the of the frame subsequent to the incoming frame.

8. A method of buffering frames in a wireless communication system, comprising:
   discarding one or more frames of a first plurality of frames based on a sub-sampling rate to form a second plurality of frames;
   partitioning a first frame of the second plurality of frames into a first plurality of partitions;
   partitioning a second frame of the second plurality of frames into a second plurality of partitions, wherein each of the second plurality of partitions respectively corresponds to one of the first plurality of partitions;
   comparing each of the second plurality of partitions with a corresponding partition of the first plurality of partitions;
   discarding any of the second plurality of partitions that are determined to not differ from the corresponding partition of the first plurality of partitions;
   evaluating a capacity of a frame buffer to store a first partition of the second plurality of partitions; and
   discarding the first partition and any remaining non-buffered partitions of the second plurality of partitions from the second plurality of frames based on the capacity of the frame buffer to form a third plurality of frames.

9. The method of claim 8, further comprising buffering any of the second plurality of partitions that are determined to differ from the corresponding partition of the first plurality of partitions.

10. The method of claim 9, further comprising transmitting to a sink each of the second plurality of partitions determined to differ from the corresponding partition of the first plurality of partitions.

11. The method of claim 10, further comprising transmitting an end of frame indicator after transmitting each of the second plurality of partitions determined to differ from the corresponding partition of the first plurality of partitions.

12. A non-transitory computer-readable medium having computer-executable instructions for execution by a processing system, the computer-executable instructions for buffering frames in a wireless communication system, comprising:
   instructions that set a sub-sampling rate that specifies a rate at which frames are discarded;
   instructions that receive a first sequence of frames for transmission to a sink;
   instructions that discard a portion of the first sequence of frames based on the sub-sampling rate to form a second sequence of frames comprising at least a first frame, the first frame comprising a first plurality of tiles;
   instructions that evaluate a capacity of a frame buffer to store a first tile of the first plurality of tiles;
   instructions that discard the first tile and any remaining non-buffered tiles of the first plurality of tiles from the second sequence of frames based on the capacity of the frame buffer to form a third sequence of frames; and
   instructions that buffer at least a portion of an incoming frame of the third sequence of frames for transmission to the sink.

13. A non-transitory computer-readable medium having computer-executable instructions for execution by a processing system, the computer-executable instructions for buffering frames in a wireless communication system, comprising:
   instructions that discard one or more frames of a first plurality of frames based on a sub-sampling rate to form a second plurality of frames;
   instructions that partition a first frame of the second plurality of frames into a first plurality of partitions;
   instructions that partition a second frame of the second plurality of frames into a second plurality of partitions, wherein each of the second plurality of partitions respectively corresponds to one of the first plurality of partitions;
   instructions that compare each of the second plurality of partitions with a corresponding partition of the first plurality of partitions;
   instructions that discard any of the second plurality of partitions that are determined to not differ from the corresponding partition of the first plurality of partitions;
   instructions that evaluate a capacity of a frame buffer to store a first partition of the second plurality of partitions; and
   instructions that discard the first partition and any remaining non-buffered partitions of the second plurality of partitions from the second plurality of frames based on the capacity of the frame buffer to form a third plurality of frames.

14. The method of claim 8, further comprising utilizing a cyclic redundancy check (CRC) to determine whether or not any of the corresponding partitions of the first and second plurality of partitions differ from each other.

15. An apparatus comprising:
   a frame buffer; and
   a processor configured to:
      set a sub-sampling rate that specifies a rate at which frames are discarded;
      receive a first sequence of frames for transmission to a sink;
      discard a portion of the first sequence of frames based on the sub-sampling rate to form a second sequence of frames comprising at least a first frame, the first frame comprising a first plurality of tiles;
      evaluate a capacity of a frame buffer to store a first tile of the first plurality of tiles;
      discard the first tile and any remaining non-buffered, tiles of the first plurality of tiles from the second sequence of frames based on the capacity of the frame buffer to form a third sequence of frames; and
      buffer at least a portion of an incoming frame of the third sequence of frames for transmission to the sink in the frame buffer.

16. The apparatus of claim 15, further comprising a transmitter configured to transmit the incoming frame to the sink.

17. The apparatus of claim 15, wherein the incoming frame is buffered in response to determining the capacity is sufficient for the incoming frame.

18. The apparatus of claim 15, wherein the processor is further configured to partition the incoming frame into a second plurality of tiles.

19. The apparatus of claim 18, wherein the processor is further configured to evaluate the buffer capacity for a compressed version of a second tile of the second plurality of tiles, and wherein the processor is further configured to store the compressed version of the second tile in the frame buffer in response to determining the buffer capacity is sufficient for storing the compressed version of the second tile.

20. The apparatus of claim 18, wherein the processor is further configured to:
   evaluate the buffer capacity for a compressed version of a second tile of the second plurality of tiles; and
   discard the second tile and any remaining non-buffered tiles of the second plurality of tiles in response to determining the buffer capacity is insufficient for storing the compressed version of the second tile.

21. The apparatus of claim 20, wherein the processor is further configured to:
   discard a plurality of tiles of a frame subsequent to the incoming frame in the sequence of frames; and
   evaluate the buffer capacity for a compressed version of an additional tile of the frame subsequent to the incoming frame, and wherein the processor is further configured to buffer in the frame buffer the compressed version of the additional tile of the frame subsequent to the incoming frame in response to determining the buffer capacity is sufficient for storing the compressed version of the additional tile of the frame subsequent to the incoming frame.

22. An apparatus comprising:
   a frame buffer; and
   a processor coupled to the frame buffer, the processor being configured to:
      discard one or more frames of a first plurality of frames based on a sub-sampling rate to form a second plurality of frames;
      partition a first frame of the second plurality of frames into a first plurality of partitions;
      partition a second frame of the second plurality of frames into a second plurality of partitions, wherein each of the second plurality of partitions respectively corresponds to one of the first plurality of partitions;

compare each of the second plurality of partitions with a corresponding partition of the first plurality of partitions;

discard any of the second plurality of partitions that are determined to not differ from the corresponding partition of the first plurality of partitions;

evaluate a capacity of a frame buffer to store a first partition of the second, plurality of partitions; and discard the first partition and any remaining non-buffered partitions of the second plurality of partitions from the second plurality of frames based on the capacity of the frame buffer to form a third plurality of frames.

23. The apparatus of claim 22, wherein the processor is configured to buffer any of the second plurality of partitions that are determined to differ from the corresponding partition of the first plurality of partitions in the frame buffer.

24. The apparatus of claim 23, further comprising a transmitter configured to transmit to a sink each of the second plurality of partitions determined to differ from the corresponding partition of the first plurality of partitions.

25. The apparatus of claim 24, wherein the transmitter is further configured to transmit an end of frame indicator after transmitting each of the second plurality of partitions determined to differ from the corresponding partition of the first plurality of partitions.

26. An apparatus comprising:
means for setting a sub-sampling rate that specifies a rate at which frames are discarded;
means for receiving a first sequence of frames for transmission to a sink;
means for discarding a portion of the first sequence of frames based on the sub-sampling rate to form a second sequence of frames comprising at least a first frame, the first frame comprising a first plurality of tiles;
means for evaluating a capacity of a frame buffer to store a first tile of the first plurality of tiles;
means for discarding the first tile and any remaining non-buffered tiles of the first plurality of tiles from the second sequence of frames based on the capacity of the frame buffer to form a third sequence of frames; and
means for buffering at least a portion of an incoming frame of the third sequence of frames for transmission to the sink.

27. An apparatus comprising:
means for discarding one or more frames of a first plurality of frames based on a sub-sampling rate to form a second plurality of frames;
means for partitioning a first frame of the second plurality of frames into a first plurality of partitions;
means for partitioning a second frame of the second plurality of frames into a second, plurality of partitions, wherein each of the second plurality of partitions respectively corresponds to one of the first plurality of partitions;
means for comparing each of the second plurality of partitions with a corresponding partition of the first plurality of partitions;

means for discarding any of the second plurality of partitions that are determined to not differ from the corresponding partition of the first plurality of partitions;
means for evaluating a capacity of a frame buffer to store a first partition of the second plurality of partitions; and
means for discarding the first partition and any remaining non-buffered partitions of the second plurality of partitions from the second plurality of frames based on the capacity of the frame buffer to form a third plurality of frames.

28. A wireless video player comprising:
an antenna;
a frame buffer; and
a processor configured to:
set a sub-sampling rate that specifies a rate at which frames are discarded;
receive a first sequence of frames for transmission to a sink;
discard a portion of the first sequence of frames based on the sub-sampling rate to form a second sequence of frames comprising at least a first frame, the first frame comprising a first plurality of tiles;
evaluate a capacity of a frame buffer to store a first tile of the first plurality of tiles;
discard the first tile and any remaining non-buffered tiles of the first plurality of tiles from the second sequence of frames based on the capacity of the frame buffer to form a third sequence of frames; and
buffer, in the frame buffer, at least a portion of an incoming frame of the third sequence of frames for transmission, via the antenna, to the sink.

29. A wireless video player comprising:
an antenna;
a frame buffer; and
a processor coupled to the frame buffer, the processor being configured to:
discard one or more frames of a first plurality of frames based on a sub-sampling rate to form a second plurality of frames;
partition a first frame of the second plurality of frames into a first plurality of partitions;
partition a second frame of the second plurality of frames into a second plurality of partitions, wherein each of the second plurality of partitions respectively corresponds to one of the first plurality of partitions;
compare each of the second plurality of partitions with a corresponding partition of the first plurality of partitions;
discard any of the second plurality of partitions that are determined to not differ from the corresponding partition of the first plurality of partitions; evaluate a capacity of a frame buffer to store a first partition of the second plurality of partitions;
discard the first partition and any remaining non-buffered partitions of the second plurality of partitions from the second plurality of frames based on the capacity of the frame buffer to form a third plurality of frames; and
buffer, in the frame buffer, at least a portion of an incoming frame of the third plurality of frames for transmission, via the antenna, to the sink.

* * * * *